United States Patent
Kaplan et al.

(10) Patent No.: US 10,223,159 B2
(45) Date of Patent: Mar. 5, 2019

(54) CONFIGURING VIRTUAL MACHINE INTERFACES TO PROVIDE ACCESS TO A REQUESTED LOGICAL NETWORK BASED ON VIRTUAL FUNCTION AVAILABILITY AND A VIRTUAL FUNCTION CAPABILITY OPTION

(71) Applicant: Red Hat Israel, Ltd., Raanana (IL)

(72) Inventors: Alona Kaplan, Raanana (IL); Michael Kolesnik, Ramat Gan (IL)

(73) Assignee: Red Hat Israel, Ltd., Raanana (IL)

(*) Notice: Subject to any disclaimer, the term of this patent is extended or adjusted under 35 U.S.C. 154(b) by 164 days.

(21) Appl. No.: 14/625,551

(22) Filed: Feb. 18, 2015

(65) Prior Publication Data
US 2016/0239326 A1 Aug. 18, 2016

(51) Int. Cl.
*G06F 9/48* (2006.01)
*G06F 9/455* (2018.01)

(52) U.S. Cl.
CPC ........ *G06F 9/4881* (2013.01); *G06F 9/45533* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 8,533,713 B2 | 9/2013 | Dong | |
| 8,645,605 B2 | 2/2014 | Subramaniyan et al. | |
| 8,756,322 B1 * | 6/2014 | Lynch | H04L 12/5695 709/226 |
| 2010/0122111 A1 * | 5/2010 | Allen | G06F 11/2005 714/3 |
| 2010/0257535 A1 * | 10/2010 | Badovinatz | G06F 11/1482 718/104 |
| 2012/0054393 A1 | 3/2012 | Yoshimura | |

(Continued)

FOREIGN PATENT DOCUMENTS

EP 2782318 A1 * 9/2014 ............... G06F 9/50

OTHER PUBLICATIONS

Martin Polednik, "Re: [ovirt-devel] SR-IOV Feature," Devel Mail Archive, Nov. 4, 2014, [retrieved Dec. 23, 2014], 4 pages, Internet: .mail-archive.com/devel@ovirt.org/msg02222.html>.

(Continued)

*Primary Examiner* — Meng Ai T An
*Assistant Examiner* — Jorge A Chu Joy-Davila
(74) *Attorney, Agent, or Firm* — Lowenstein Sandler LLP (57) ABSTRACT

A virtualization manager receives a request to configure a virtual interface of a virtual machine, the request comprising a selected logical network to be associated with the virtual interface and a virtual function capability option selection for the virtual interface. The virtualization manager then determines whether there is an available virtual function associated with the requested logical network. Responsive to determining there is an available virtual function, the virtualization manager assigns the virtual function to the virtual interface. Responsive to determining there is not an available virtual function, the virtualization manager further configures the virtual interface according to the virtual function capability option selection.

20 Claims, 5 Drawing Sheets

(56) References Cited

U.S. PATENT DOCUMENTS

| | | | |
|---|---|---|---|
| 2012/0131590 A1* | 5/2012 | Brownlow | G06F 9/5077 |
| | | | 718/104 |
| 2012/0159245 A1* | 6/2012 | Brownlow | G06F 11/0712 |
| | | | 714/23 |
| 2012/0278802 A1* | 11/2012 | Nilakantan | G06F 9/45558 |
| | | | 718/1 |
| 2012/0284712 A1 | 11/2012 | Nimmagadda et al. | |
| 2012/0297379 A1* | 11/2012 | Anderson | G06F 9/45558 |
| | | | 718/1 |
| 2013/0086583 A1 | 4/2013 | Uemura et al. | |
| 2013/0254767 A1 | 9/2013 | Mizuno et al. | |
| 2013/0339955 A1* | 12/2013 | Prawer | G06F 9/45533 |
| | | | 718/1 |
| 2014/0092912 A1* | 4/2014 | Hathorn | H04L 49/351 |
| | | | 370/401 |
| 2017/0279664 A1* | 9/2017 | Zhang | H04L 12/283 |

OTHER PUBLICATIONS

No Author, "SR-IOV-Passthrough-For-Networking—OpenStack," Wiki Openstack, [retrieved Dec. 23, 2014], 5 pages, Internet: //wiki.openstack.org/wiki/SR-IOV-Passthrough-For-Networking>.

No Author, "Assign a Virtual Function as SR-IOV Passthrough Adapter to a Virtual Machine by Using the vSphere Web Client," vSphere 5.5 Documentation Center, [retrieved Dec. 23, 2014], 2 pages, Internet:pubs.vmware.com/vsphere-55/index.jsp?topic=%2Fcom.vmware.vsphere.networking.doc%2FGUID-898A3D66-9415-4854-8413-B40F2CB6FF8D.html>.

\* cited by examiner

CONFIGURING VIRTUAL MACHINE INTERFACES TO PROVIDE ACCESS TO A REQUESTED LOGICAL NETWORK BASED ON VIRTUAL FUNCTION AVAILABILITY AND A VIRTUAL FUNCTION CAPABILITY OPTION

TECHNICAL FIELD

The present disclosure is generally related to computer systems, and more particularly, to virtual device management in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

A VM may comprise one or more "virtual devices," each of which may map to a physical device of the host machine (e.g., a network interface device, an I/O device such as a CD-ROM drive, a disk array, etc.). Single Root I/O Virtualization (SR-IOV) enables a single physical I/O device (e.g., a single Ethernet port) to appear as multiple, separate physical devices. A virtualization management system, or "virtualization manager," can manage the allocation of resources from host machines to VMs, monitor the status of the VMs, as well as the progress of commands and processes being executed by the VMs, and generally manage operations in the system.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for SR-IOV scheduling for virtual machines with fallback. SR-IOV is a virtualization networking specification that uses physical function (PFs) and virtual functions (VFs). Physical functions are full-featured PCIe devices that include all configuration resources and capabilities for the device. Virtual functions are "lightweight" PCIe functions that contain the resources necessary for data movement, but have a carefully minimized set of configuration resources. A virtual machine's virtual device (e.g., a vNIC) can be connected directly to a virtual function instead of a virtual network bridge, bypassing virtual networking on the host to reduce latency between the VM and the physical device and lower CPU utilization devoted to packet transfer.

Connecting a vNIC to a virtual function can require that a user identify a specific virtual function in the network. To do so, a user may need to have detailed knowledge of network architecture since the user may need to identify an SR-IOV capable physical device that provides access to the logical network needed by the virtual machine. Moreover, once a user does identify an appropriate physical device, there is no guarantee that any virtual functions may be available. This could then require that the user locate a hypervisor with a virtual bridge that can provide connectivity to the needed logical network. Requiring the user to select the virtual function adds complexity to network configuration and can result in wasted resources as well as increased configuration time.

Aspects of the present disclosure address the above noted deficiency by supporting dynamic scheduling for virtual machines where the virtualization manager can identify an SR-IOV virtual function when provided only the logical network. Additionally, if no available SR-IOV virtual function can be identified, the virtualization manager can then failover to a virtual bridge to connect the virtual machine to the logical network either temporarily or permanently. It should be noted that although, for simplicity, aspects of the present disclosure have been described below with respect to the SR-IOV specification, in some implementations they may be applied to any specification or protocol that provides virtual function capability for physical interfaces.

In an illustrative example, a virtualization manager can receive a request to configure a virtual interface of a virtual machine. The request may be received from a user while creating a virtual machine using, for example, a user interface for the virtualization manager. The user may request that the virtualization manager configure the virtual interface with SR-IOV virtual function capability (e.g., assign a virtual function to the virtual interface). For example, the user may use the user interface to mark a vNIC associated with the virtual machine as an SR-IOV virtual function "passthrough" device. The request may comprise an identifier for a selected logical network to be associated with the virtual interface and an SR-IOV virtual function capability option. The identifier for the selected logical network may be a unique identifier (e.g., virtual local area network (VLAN) tag, network alias, or the like) that identifies a particular logical network available to the virtualization manager.

An SR-IOV virtual function capability option may be an option that the user may select to notify the virtualization manager whether the SR-IOV virtual function capability is required for the virtual interface. The SR-IOV virtual function capability option could be selected by the user from a list of options on a user interface. For example, the SR-IOV virtual function capability options could be 'mandatory' (meaning that an SR-IOV virtual function should be assigned), 'not mandatory' or 'optional' (meaning that an SR-IOV virtual function may be assigned if available, but if not available, fallback to assignment of a virtual bridge is acceptable), or 'preferred' (meaning that if an SR-IOV virtual function is not available, fallback to a virtual bridge is acceptable but the virtualization manager should monitor the network until a virtual function becomes available).

The virtualization manager may then determine whether there is an available SR-IOV virtual function associated with the requested logical network. To do so, the virtualization manager may first retrieve a list of hypervisors available to the virtualization manager. In some implementations, the virtualization manager may maintain the list as hypervisors are added to the environment under management. For example, the virtualization manager may store a list in memory, in a configuration file, in a data store accessible to the host on which the virtualization manager executes, or in any similar manner.

The virtualization manager may then select a hypervisor from the list of hypervisors and determine whether there are any virtual functions available to be assigned. The virtualization manager may select the hypervisor from the list of hypervisors in sequential order (e.g., in the order the list is returned). Alternatively, the virtualization manager may optimize the hypervisor selection by applying a weight value to each hypervisor on the list. The weight value can be applied to assess the relative amount of available resources on one hypervisor when compared to others on the list. For example, a hypervisor with a greater amount of free RAM can be weighted higher than one with less free RAM. Additionally, a hypervisor with a greater level of available CPU (e.g., according to current or average statistics measuring CPU utilization for the hypervisor) may be weighted higher than one with less available CPU. Similarly, a hypervisor with a lower level of network utilization (e.g., according to current or average statistics measuring network usage for the hypervisor) may be weighted higher than one with a higher level of network utilization. Alternatively, other similar factors may be used to assess available resources for the hypervisor. In some implementations, a combination of the above factors may be used to assess the weight value.

Once a hypervisor is selected, the virtualization manager may identify a physical interface supporting virtual function capability (e.g., SR-IOV capable) that is available to the selected hypervisor. In some implementations, the virtualization manager may send a request to an agent executing on the selected hypervisor for a list of available physical interfaces with virtual function capability. Alternatively, the virtualization manager may maintain the list of physical interfaces supporting virtual function capability available to the selected hypervisor as the physical interfaces are added to the selected hypervisor. For example, the virtualization manager may store the list in memory, in a configuration file, in a data store accessible to the host on which the virtualization manager executes, or in any similar manner. If there are no physical interfaces supporting virtual function capability available on the selected hypervisor, the virtualization manager can select the next hypervisor from the list of hypervisors and repeat the process.

Once a physical interface supporting virtual function capability has been identified, the virtualization manager may retrieve a list of logical networks associated with the identified physical interface. The list may be a list of logical network identifiers or network labels (e.g., that represent a group of logical networks) associated with the physical interface supporting virtual function capability. The list of logical networks may be stored on the identified hypervisor in a data store accessible to the identified hypervisor, in hypervisor memory, or in any similar manner. The virtualization manager may send a request to the identified hypervisor for list of networks. Alternatively, the virtualization manager may store a list in local memory, in a configuration file, in a data store accessible to the host on which the virtualization manager executes, or in any similar manner.

Once the list of associated logical networks has been retrieved, the virtualization manager may then determine whether the selected logical network from the configuration request is present in the list of logical networks associated with the identified physical interface. If the virtualization manager cannot identify the selected logical network of the configuration request in the list of logical networks, the virtualization manager may identify another physical interface supporting virtual function capability that is associated with the selected hypervisor and repeat the process.

In response to identifying the selected logical network of the configuration request in the list of logical networks associated with the physical interface supporting virtual function capability, the virtualization manager may then determine whether there is an available virtual function associated with the physical interface that may be assigned to the virtual machine. In some implementations, the virtualization manager may make the determination based on an availability status associated with each virtual function for a physical interface. The availability status may indicate whether the virtual function is available for assignment according to whether it has already been assigned to a virtual machine, whether it has been attached to another device (e.g., a virtual bridge, a tap device, etc.), or whether it is unavailable to be assigned for any other reason. The availability status may be stored locally by the virtualization manager in a data store, in a memory space, or in any similar manner. Alternatively, the virtualization manager may receive the availability status for each virtual function when it receives the list of physical interfaces supporting virtual function capability available on the selected hypervisor.

If the virtualization manager determines that there is an available virtual function associated with the physical interface, it may assign the virtual function to the virtual machine. Subsequently, the virtualization manager may launch the virtual machine on the selected hypervisor associated with the physical interface. If the virtualization manager determines that there is not an available virtual function associated with the physical interface, the virtualization manager may identify another physical interface supporting virtual function capability that is associated with the selected hypervisor and repeat the process. If the virtualization manager determines that there are no available virtual functions for any physical interface supporting virtual function capability that is associated with the selected logical network on the selected hypervisor, the virtualization manager may repeat the process for another hypervisor from the list of hypervisors.

If no hypervisor under management provides the requested SR-IOV virtual function capability, the virtualization manager may further configure the virtual interface in view of the SR-IOV virtual function capability option selection from the configuration request. As noted above, in some implementations, the SR-IOV virtual function capability options could be 'mandatory', 'not mandatory', or 'preferred'. If the SR-IOV virtual function capability option indicates that an SR-IOV virtual function should be assigned (e.g., 'mandatory'), the virtualization manager may then reject the request to configure the virtual interface, and subsequently reject starting the virtual machine entirely, since SR-IOV virtual function capability is not available.

If the SR-IOV virtual function capability option indicates that fallback to assignment of a virtual bridge is acceptable (e.g., 'not mandatory'), the virtualization manager may then determine if there is a virtual bridge connection configured to provide connectivity to the logical network of the configuration request. The virtualization manager may first retrieve the list of hypervisors available under management. The virtualization manager may then identify a hypervisor from the list of hypervisors that has a physical interface without virtual function capability that is associated with the selected logical network from the configuration request (e.g., a hypervisor with a virtual bridge available to the logical network). In some implementations, the virtualization manager may send a request to an agent executing on the selected hypervisor for a list of physical interfaces without virtual function capability available. Alternatively, the virtualization manager may maintain the list of physical interfaces without virtual function capability that are available to the selected hypervisor as the physical interfaces are added to the selected hypervisor. For example, the virtualization manager may store the list in memory, in a configuration file, in a data store accessible to the host on which the virtualization manager executes, or in any similar manner.

If the virtualization manager identifies a physical interface without virtual function capability that provides connectivity to the selected logical network (e.g., a physical interface associated with the logical network that is connected to a virtual bridge), the virtualization manager may connect the virtual interface of the virtual machine to the identified physical interface without virtual function capability (e.g., by connecting to the virtual bridge connected to the physical interface) and start the virtual machine on the associated hypervisor. If there are no physical interfaces without virtual function capability available on the selected hypervisor that provide connectivity to the selected logical network, the virtualization manager can select the next hypervisor from the list of hypervisors and repeat the process. If there are no physical interfaces without virtual function capability that provide connectivity to the selected logical network associated with any of the hypervisors from the list of hypervisors, the virtualization manager may reject the configuration request.

If the SR-IOV virtual function capability option indicates fallback to a virtual bridge is acceptable, but the virtualization manager should monitor the network until a virtual function becomes available (e.g. 'preferred'), the virtualization manager may monitor any physical interfaces supporting virtual function capability associated with the selected logical network until a virtual function becomes available. In an illustrative example, the virtualization manager may monitor the availability status of the virtual functions associated with an identified physical interface supporting virtual function capability. As noted above, the availability status may be stored locally by the virtualization manager in a data store, in a memory space, or in any similar manner. Alternatively, the virtualization manager may receive the availability status for each virtual function when it receives the list of physical interfaces supporting virtual function capability available on the selected hypervisor.

If the virtualization manager determines that the availability status of a virtual function indicates that a virtual function that can provide the desired connectivity has become available, the virtualization manager may then assign the virtual function to the virtual interface of the virtual machine. In some implementations, the virtualization manager may send a notification to a user to alert the user that the virtual function has become available. The user may then need to take action to reconfigure the virtual interface. Alternatively, the virtualization manager may reconfigure the virtual interface. For example, if the virtual function is associated with the same hypervisor as the existing virtual bridge without virtual function capability, the virtualization manager may reconfigure the virtual interface to connect to the virtual function. If the virtual function is associated with a physical interface supporting virtual function capability on a different hypervisor, the virtualization manager may migrate the virtual machine to the hypervisor with the available virtual function.

Aspects of the present disclosure are thus capable of supporting dynamic scheduling for virtual machines in an SR-IOV environment. More particularly, aspects of the present disclosure can provide the ability for a virtualization manager to identify a virtual function when only provided a destination logical network, and if none are available, fallback to a virtual bridge connection without requiring additional user intervention.

Figure 1:
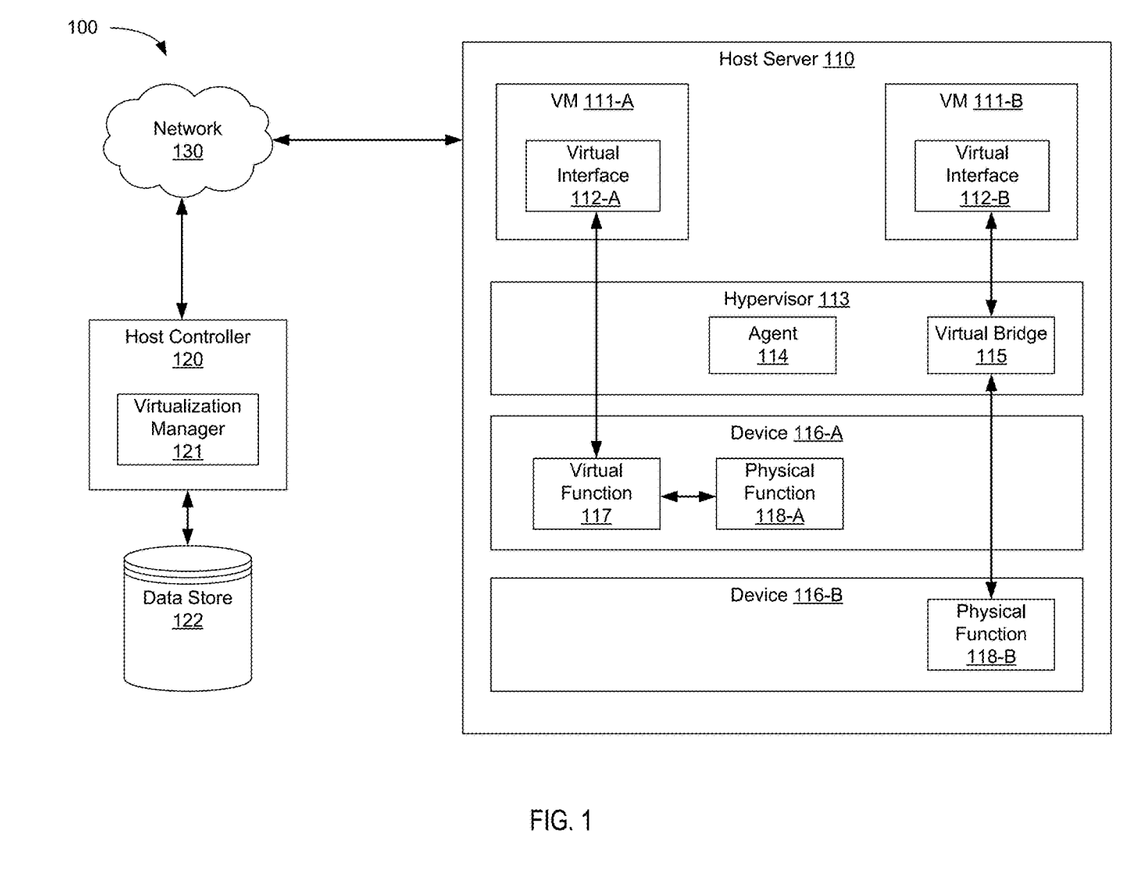
FIG. 1 depicts a high-level component diagram of an example computer system architecture, in accordance with one or more aspects of the present disclosure.

FIG. 1 depicts a high-level component diagram of an illustrative example of a network architecture 100, in accordance with one or more aspects of the present disclosure. One skilled in the art will appreciate that other architectures for network architecture 100 are possible, and that the implementation of a network architecture utilizing examples of the invention are not necessarily limited to the specific architecture depicted by FIG. 1.

The network architecture 100 includes one or more host servers 110 coupled to a host controller 120 over a network 130. The network 130 may be a private network (e.g., a local area network (LAN), wide area network (WAN), intranet, etc.) or a public network (e.g., the Internet). Host controller 120 may be an independent machine such as a server computer, a desktop computer, etc. Alternatively, the host controller 120 may be part of the host server 110.

Host server 110 may comprise server computers or any other computing devices capable of running one or more virtual machines (VM) 111. Each VM 111 runs a guest operating system (OS) (not pictured) that may be different from one virtual machine to another. The guest OS may include Microsoft Windows, Linux, Solaris, Mac OS, etc. The host server 110 may also comprise a hypervisor 113 that emulates the underlying hardware platform for VM 111. The hypervisor 113 may also be known as a virtual machine monitor (VMM) or a kernel-based hypervisor. The host server 110 may also comprise one or more devices 116 available on host server 110 (e.g., a network interface device, an I/O device such as a CD-ROM driver, a disk array, etc.) that may or may not support virtual function capability.

The hypervisor 113 may comprise agent 114 that monitors VMs (e.g., VM 111) that may run on host server 110. Agent 114 can monitor VM runtime status, hardware configuration, network and storage connectivity on the host server 110, and similar VM-related and host-related statistical information. Agent 114 may store this information as it is collected for later use by the virtualization manager 121. For example, Agent 114 may save this information in a local memory space. Alternatively, agent 114 may save the information to a data store accessible by the host server 110. Agent 114 can send and receive information regarding VM 111 via an API that allows statistics agent 114 to communicate with other components of network architecture 100. Agent 114 may additionally provide information upon request from virtualization manager 121 relating to the devices that support virtual function capability as described in detail below with respect to FIGS. 3 and 4. Hypervisor 113 may additionally comprise virtual bridge 115 that can be used to connect a virtual interface of one or more of VMs 111 to a physical device that may not support virtual function capability.

Devices 116 may or may not support virtual function capabilities for use with virtual interfaces 112 of VMs 111. In FIG. 1, device 116-A depicts a device supporting virtual function capability (e.g., SR-IOV capable). Device 116-A comprises virtual function 117 and physical function 118-A. Virtual function 117 can comprise resources necessary for data movement, but have a minimized set of configuration resources (e.g., SR-IOV PCIe virtual functions). It should be noted that although for simplicity only one virtual function 117 is depicted, in other implementations, multiple virtual functions 117 may be present. Physical function 118-A can comprise full-featured PCIe devices that include all configuration resources and capabilities for device 116-A. Virtual function 117 may be assigned to virtual interface 112-A in order to provide VM 111-A access to physical function 118-A. Device 116-B depicts a device that does not support virtual function capability, comprising physical function 118-B, which may not be connected to any virtual functions. It should be noted that although for simplicity device 116-A and 116-B each depict different virtual function capability, in other implementations, devices 116 may support both virtual function capability as well as connectivity via a virtual bridge.

Each VM 111 may comprise a virtual interface that provides connectivity to one of the devices 116 of host server 110. VM 111-A depicts a virtual interface 112-A that is connected to physical function 118-A of device 116-A via a virtual function 117. VM 111-B depicts a virtual interface 112-B that is connected to physical function 118-B of device 116-B via virtual bridge 115.

Each VM 111 may be linked to one or more virtual disks (not shown). These virtual disks can be logical partitions of a physical disk managed by hypervisor 113, can be cloud based storage devices, or can be some other type of virtual storage device. In one embodiment, virtual disks may form a whole or part of a logical data center. In one embodiment, VM 111 and virtual disks, together with host server 110, may be collectively referred to as entities in a virtual machine system.

The VM 111 and virtual disks can be managed by a host controller 120 (e.g., after the host 110 has been associated with the host controller 120). Host controller 120 may manage the allocation of resources from host server 110 to VM 111. In addition, host controller may monitor the status of VM 111 as well as the progress of commands and processes being executed by VM 111 and/or on VM 111. In some implementations host controller 120 may run on a separate physical machine from the host server 110. Alternatively, host controller 120 may run on the host server 110 itself. The host controller 120 may include a virtualization manager 121 to determine availability of virtual function 117, as described in detail below with respect to FIGS. 3-4. The host controller 120 may also maintain a data store 122 to store information pertaining to the various devices 116 in the virtualization system (e.g., virtual interfaces, virtual disks, etc.). The data store 122 may share the machine with the host controller 120 (e.g., a disk drive in the host controller computer) or be an independent device coupled to the host controller directly or via a network (e.g., as a network-attached storage device (NAS)).

Figure 2:
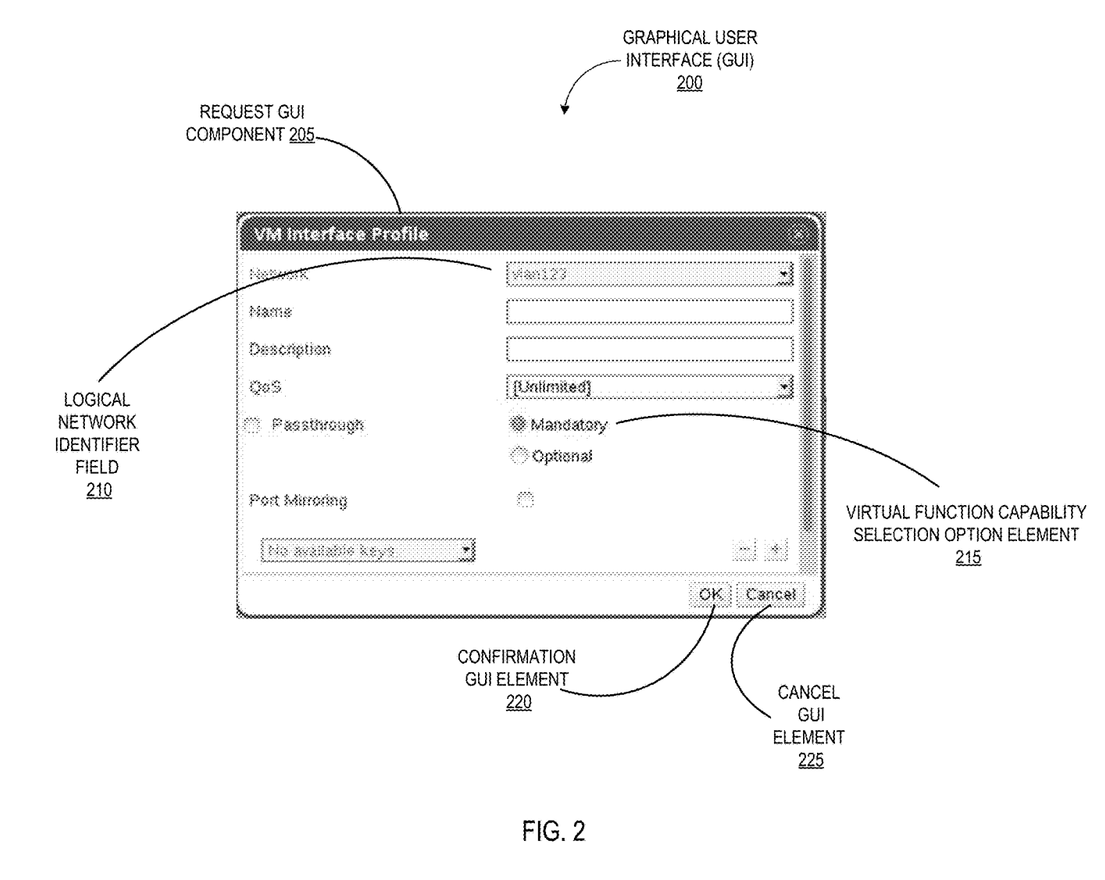
FIG. 2 illustrates an example of a graphical user interface (GUI) for selecting virtual function capability, in accordance with one or more aspects of the present disclosure.

FIG. 2 illustrates an example of a graphical user interface (GUI) 200 for selecting virtual function capability. GUI 200 may be presented by a stand-alone application, a component of a user interface for a virtualization manager, or in any other manner. For example, GUI 200 may be presented to a user by virtualization manager 121 of FIG. 1 as described in detail below with respect to FIGS. 3-4.

GUI 200 may present request GUI component 205 to a user in order to submit a request to a virtualization manager to configure a virtual interface of a virtual machine. The user may enter identification information in logical network identifier field 210 that can specify the logical network that the user wishes to associate with the virtual interface. Logical network identifier 210 may be a unique identifier (e.g., a virtual logical area network (VLAN) tag, network alias, or the like) that identifies a particular logical network available to the virtualization manager.

Virtual function capability selection option element 215 can be an input field that allows the user to specify the virtual function capability option for the request. Virtual function capability selection option element 215 may be an option that the user may select to notify the virtualization manager whether SR-IOV virtual function capability is required for the virtual interface selected in logical network identifier element 210. As shown in FIG. 2, virtual function capability selection option element 215 may be displayed as a graphical user interface radio button, but in other implementations may be a checkbox, a dropdown list, or the like. Also as shown in FIG. 2, virtual function capability selection option element 215 presents the options 'mandatory' (meaning that an SR-IOV virtual function should be assigned), and 'optional' (meaning that an SR-IOV virtual function may be assigned if available, but if not available, fallback to assignment of a virtual bridge is acceptable). In some implementations, virtual function capability selection option element 215 may additionally present an option to indicate that if an SR-IOV virtual function is not available, fallback to a virtual bridge is acceptable but the virtualization manager should monitor the network until a virtual function becomes available (e.g., 'preferred').

Once the user selects the confirmation GUI element 220 on request GUI component 205, the virtualization manager can configure the virtual interface as described in detail below with respect to FIGS. 3-4. If the user selects 'mandatory' passthrough (e.g., a virtual function should be assigned) and a virtual function is not available for the selected logical network in logical network identifier element 210, the virtualization manager may display a dialog box or alert window (not shown) in GUI 200 to alert the user. The user may then elect an alternative virtual function capability selection (e.g., switching from 'mandatory' to 'optional'). Alternatively, the user may cancel the configuration request by clicking the cancel GUI element 225. In FIG. 2, confirmation GUI element 220 and cancel GUI element 225 are represented as buttons on a graphical user interface, but in other implementations can be links, dropdown lists, checkboxes, or any other GUI elements that provide similar functionality.

Figure 3:
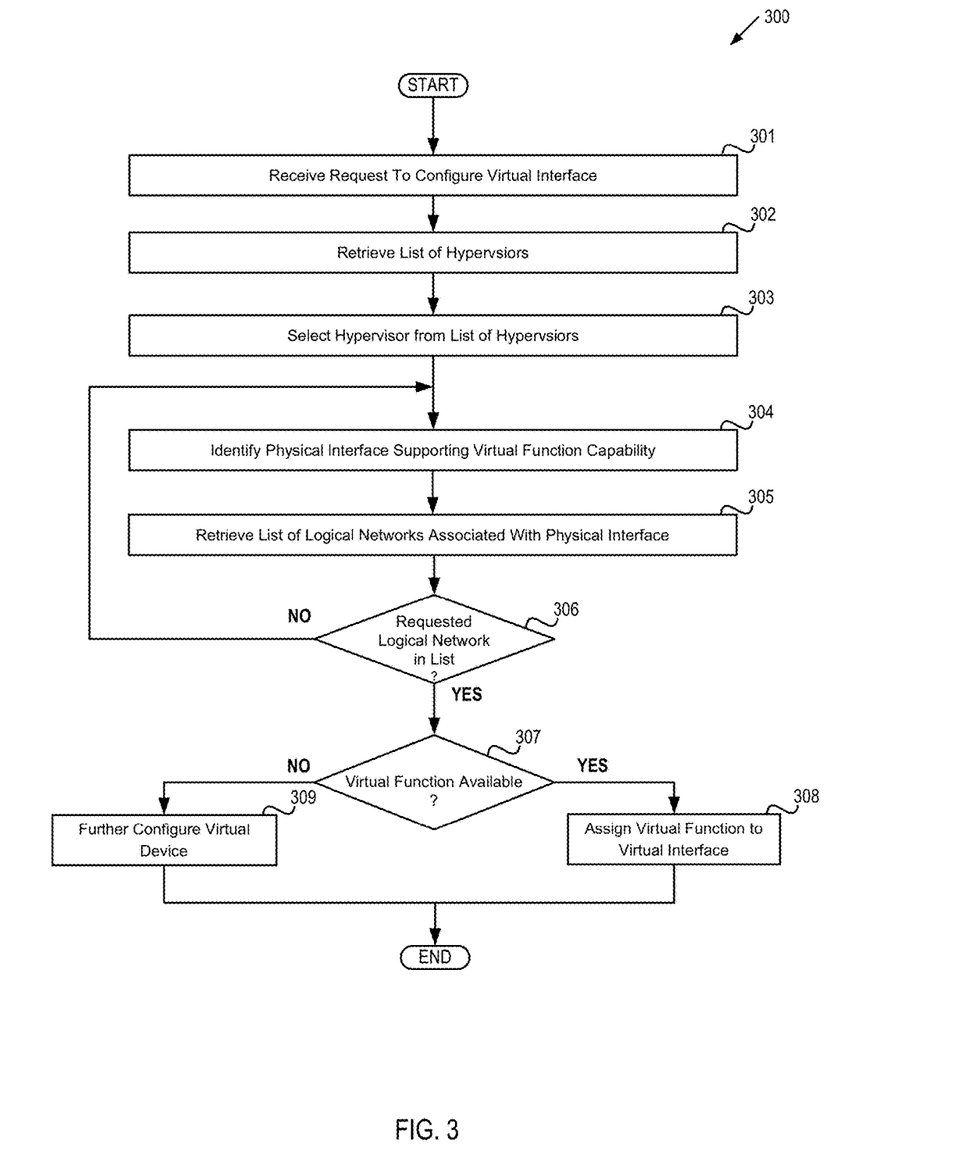
FIG. 3 depicts a flow diagram of a method for determining the availability of a virtual function for a logical network, in accordance with one or more aspects of the present disclosure.

FIG. 3 depicts a flow diagram of an example method 300 for determining the availability of a virtual function for a logical network. The method may be performed by processing logic that may comprise hardware (circuitry, dedicated logic, etc.), software (such as is run on a general purpose computer system or a dedicated machine), or a combination of both. In one illustrative example, method 300 may be performed by virtualization manager 121 of host controller 120 in FIG. 1. Alternatively, some or all of method 300 might be performed by another module or machine. It should be noted that blocks depicted in FIG. 3 could be performed simultaneously or in a different order than that depicted.

At block 301, processing logic receives a request to configure a virtual interface. The request may be received from a user while creating a virtual machine using (e.g., via a user interface for the virtualization manager). The user may request that the virtual interface is configured with SR-IOV virtual function capability (e.g., assign a virtual function to the virtual interface). For example, the user may use a user interface to mark a vNIC associated with the virtual machine as an SR-IOV virtual function "passthrough" device. The request may comprise an identifier for a selected logical network to be associated with the virtual interface and an SR-IOV virtual function capability option. The identifier for the selected logical network may be a unique identifier (e.g., a virtual logical area network (VLAN) tag, network alias, or the like) that is identifies a particular logical network available to the virtualization manager.

An SR-IOV virtual function capability option may be an option that the user may select to notify the virtualization manager whether the SR-IOV virtual function capability is required for the virtual interface. The SR-IOV virtual function capability option could be selected by the user from a list of options on a user interface. For example, the SR-IOV virtual function capability options could be 'mandatory' (meaning that an SR-IOV virtual function should be assigned), 'not mandatory' or 'optional' (meaning that an SR-IOV virtual function may be assigned if available, but if not available, fallback to assignment of a virtual bridge is acceptable), or 'preferred' (meaning that if an SR-IOV virtual function is not available, fallback to a virtual bridge is acceptable but the virtualization manager should monitor the network until a virtual function becomes available).

At block 302, processing logic retrieves a list of hypervisors to determine whether there is an available virtual function associated with the requested logical network. In some implementations, processing logic may maintain the list as hypervisors are added to the environment under management. For example, processing logic may store a list in memory, in a configuration file, in a data store, or in any similar manner.

At block 303, processing logic selects a hypervisor from the list of hypervisors to determine whether there are any virtual functions available to be assigned. Processing logic may select the hypervisor from the list of hypervisors in sequential order (e.g., in the order the list is returned). Alternatively, processing logic may optimize the hypervisor selection by applying a weight value to each hypervisor on the list. The weight value can be applied to assess the relative amount of available resources on one hypervisor when compared to others on the list (e.g., a hypervisor with a greater amount of free RAM can be weighted higher than one with less free RAM).

At block 304, processing logic identifies a physical interface supporting virtual function capability that is available to the selected hypervisor. In some implementations, processing logic may send a request to an agent executing on the selected hypervisor for a list of available physical interfaces with virtual function capability. Alternatively, processing logic may maintain the list of physical interfaces supporting virtual function capability available to the selected hypervisor as the physical interfaces are added to the selected hypervisor. For example, processing logic may store the list in memory, in a configuration file, in a data store, or in any similar manner. If there are no physical interfaces supporting virtual function capability available on the selected hypervisor, processing logic can select the next hypervisor from the list of hypervisors and repeat the process.

At block 305, processing logic retrieves a list of logical networks associated with the physical interface. The list may be a list of logical network identifiers or network labels (e.g., that represent a group of logical networks) associated with the physical interface supporting virtual function capability. The list of logical networks may be stored on the identified hypervisor in a data store accessible to the identified hypervisor, in hypervisor memory, or in any similar manner. Processing logic may send a request to the identified hypervisor for list of networks. Alternatively, processing logic may store a list in local memory, in a configuration file, in a data store, or in any similar manner.

At block 306, processing logic determines whether the logical network of the configuration request is in the list of networks associated with the physical interface. If so, processing continues to block 307. Otherwise, processing returns to block 304 to identify another physical interface supporting virtual function capability.

At block 307, processing logic determines if a virtual function is available for the physical interface. If so, processing logic proceeds to block 308 where processing logic assigns the virtual function to the virtual interface. If not, processing logic proceeds to block 309 where processing logic further configures the virtual device in view of the virtual function capability option selection. In some implementations, processing logic may further configure the virtual device as described in detail below with respect to FIG. 4. In some implementations, processing logic may make the determination based on an availability status associated with each virtual function for a physical interface to indicate whether the virtual function is available for assignment or has already been assigned to a virtual machine. The availability status may be stored locally by processing logic in a data store, in a memory space, or in any similar manner. Alternatively, processing logic may receive the availability status for each virtual function when it receives the list of physical interfaces supporting virtual function capability available on the selected hypervisor.

After either block 308 or 309, the method of FIG. 3 terminates.

Figure 4:
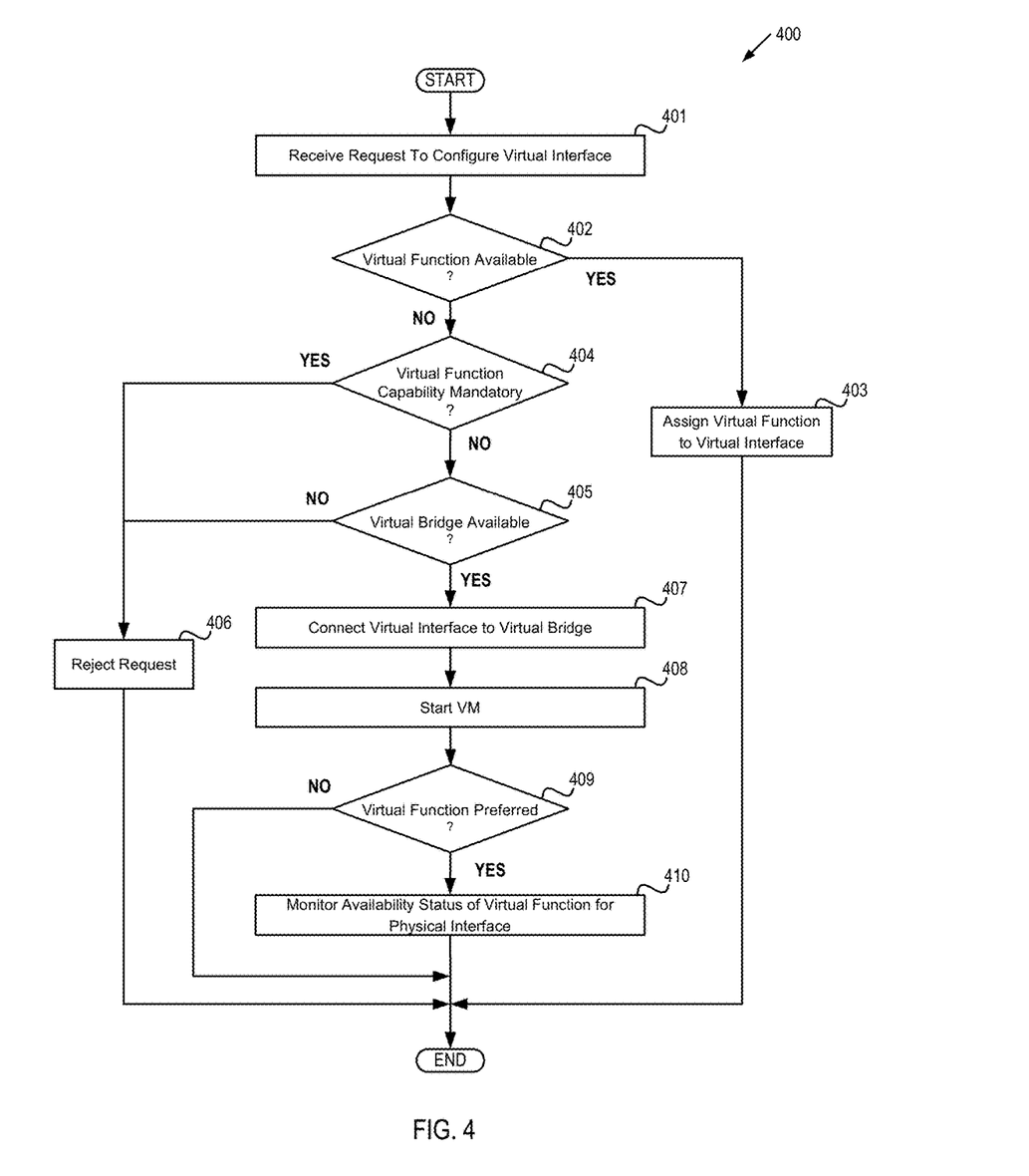
FIG. 4 depicts a flow diagram of a method for further configuring a virtual device according to a virtual function capability option selection, in accordance with one or more aspects of the present disclosure.

FIG. 4 depicts a flow diagram of an example method 400 for further configuring a virtual device according to a virtual function capability option selection. The method may be performed by processing logic that may comprise hardware (circuitry, dedicated logic, etc.), software (such as is run on a general purpose computer system or a dedicated machine), or a combination of both. In one illustrative example, method 400 may be performed by virtualization manager 121 of host controller 120 in FIG. 1. Alternatively, some or all of method 400 might be performed by another module or machine. It should be noted that blocks depicted in FIG. 4 could be performed simultaneously or in a different order than that depicted.

At block 401, processing logic receives a request to configure a virtual interface. The request may be received from a user while creating a virtual machine using (e.g., via a user interface for the virtualization manager). The user may request that the virtual interface is configured with SR-IOV virtual function capability (e.g., assign a virtual function to the virtual interface). For example, the user may use a user interface to mark a vNIC associated with the virtual machine as an SR-IOV virtual function "passthrough" device. The request may comprise an identifier for a selected logical network to which to associate the virtual interface and an SR-IOV virtual function capability option. The identifier for the selected logical network may be a unique identifier (e.g., an IP address, network alias, or the like) that is identifies a particular logical network available to the virtualization manager. An SR-IOV virtual function capability option may be an option that the user may select to notify the virtualization manager whether the SR-IOV virtual function capability is required for the virtual interface. The SR-IOV virtual function capability option could be selected by the user from a list of options on a user interface. For example, the SR-IOV virtual function capability options could be 'mandatory' (meaning that an SR-IOV virtual function should be assigned), 'not mandatory' (meaning that an SR-IOV virtual function may be assigned if available, but if not available, fallback to assignment of a virtual bridge is acceptable), or 'preferred' (meaning that if an SR-IOV virtual function is not available, fallback to a virtual bridge is acceptable but the virtualization manager should monitor the network until a virtual function becomes available).

At block 402, processing logic determines if a virtual function is available for the physical interface. If so, processing logic proceeds to block 403 where processing logic assigns the virtual function to the virtual interface. If not, processing logic proceeds to block 404 where processing logic further configures the virtual device in view of the virtual function capability option selection. In some implementations, processing logic may make the determination based on an availability status associated with each virtual function for a physical interface to indicate whether the virtual function is available for assignment or has already been assigned to a virtual machine. The availability status may be stored locally by the virtualization manager in a data store, in a memory space, or in any similar manner. Alternatively, processing logic may receive the availability status for each virtual function when it receives the list of physical interfaces supporting virtual function capability available on the selected hypervisor.

At block 404, processing logic determines whether virtual function capability is mandatory according to the SR-IOV virtual function capability option received at block 401. If so, processing proceeds to block 406 where the request to configure the virtual interface is rejected and the method of FIG. 4 terminates. Otherwise, processing continues to block 405.

At block 405, processing logic determines whether a virtual bridge connection is available that provides the connectivity to the logical network of the configuration request. If not, processing logic proceeds to block 406 where the request to configure the virtual interface is rejected and the method of FIG. 4 terminates. Otherwise, processing continues to block 407. Processing logic may first retrieve the list of hypervisors available under management, then identify a hypervisor from the list of hypervisors that has a physical interface without virtual function capability that is associated with the selected logical network from the configuration request (e.g., a hypervisor with a virtual bridge available to the logical network).

At block 407, processing logic connects the virtual interface to the virtual bridge. At block 408, processing logic starts the virtual machine using the virtual bridge interface.

At block 409, processing logic determines whether virtual function capability is preferred according to the SR-IOV virtual function capability option received at block 401. If not, the method of FIG. 4 terminates. Otherwise, processing continues to block 410.

At block 410, processing logic monitors the availability status of virtual functions for the physical interface until a virtual function becomes available. In an illustrative example, processing logic may monitor the availability status of the virtual functions associated with an identified physical interface supporting virtual function capability. If processing logic determines that the availability status of a virtual function indicates that a virtual function that can provide the desired connectivity has become available, the virtualization manager may then assign the virtual function to the virtual interface of the virtual machine. In some implementations, processing logic may send a notification to a user to alert the user that the virtual function has become available. The user may then need to take action to reconfigure the virtual interface. Alternatively, processing logic may reconfigure the virtual interface.

After block 410, the method of FIG. 4 terminates.

Figure 5:
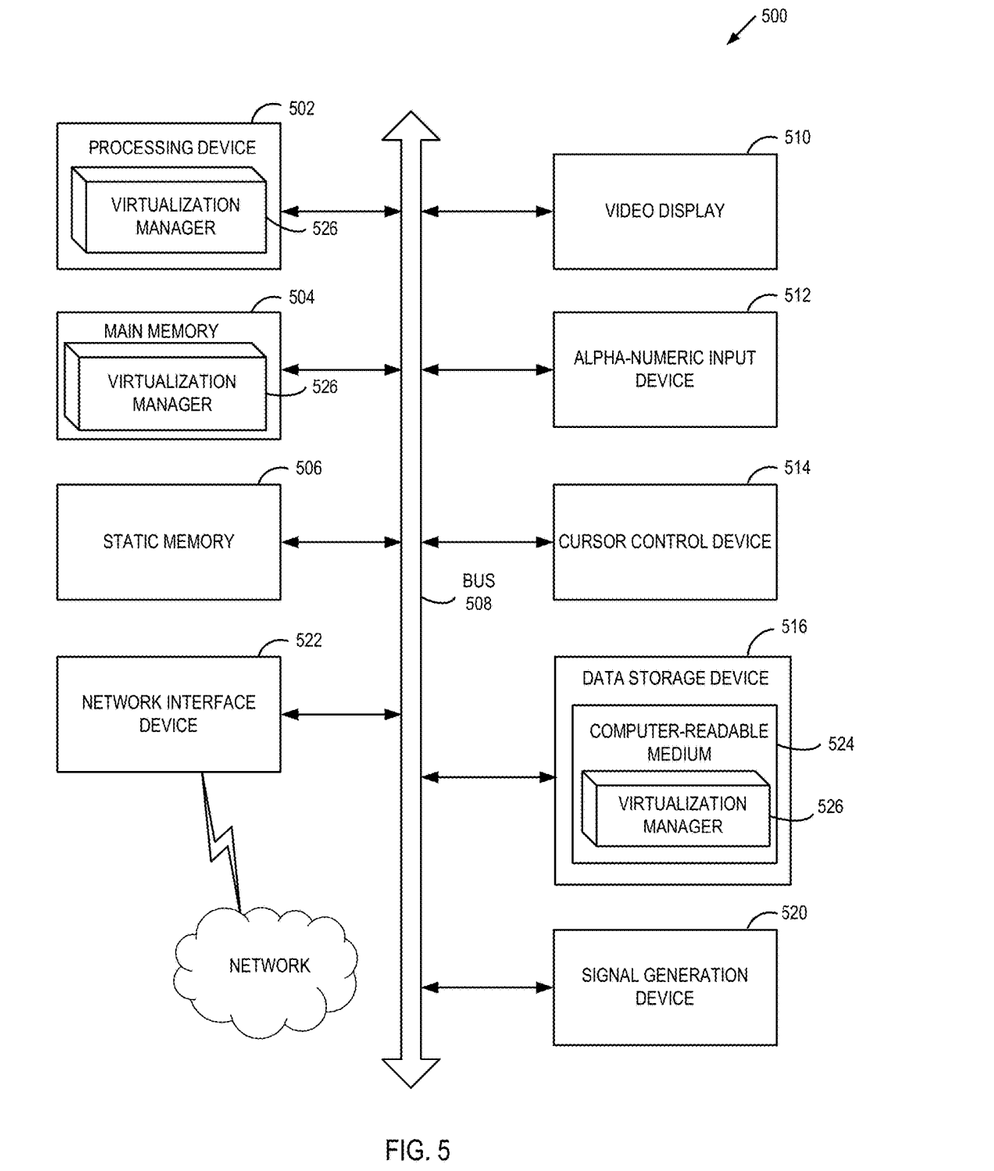
FIG. 5 depicts a block diagram of an illustrative computer system operating in accordance with examples of the invention.

FIG. 5 depicts an example computer system 500 which can perform any one or more of the methods described herein. In one example, computer system 500 may correspond to network architecture 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary network architecture 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute virtualization manager 526 for performing the operations and steps discussed herein (e.g., corresponding to the methods of FIGS. 3-4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a computer-readable medium 524 on which is stored virtualization manager 526 (e.g., corresponding to the methods of FIGS. 3-4, etc.) embodying any one or more of the methodologies or functions described herein. Virtualization manager 526 may also reside, completely or at least partially, within the main memory 504 and/or within the processing device 502 during execution thereof by the computer system 700, the main memory 504 and the processing device 502 also constituting computer-readable media. Virtualization manager 526 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "assigning," "configuring," "retrieving," "selecting," "identifying," "rejecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   receiving, by a processing device executing a virtualization manager, a request to configure a virtual interface of a virtual machine, the request comprising a selected logical network to be associated with the virtual interface and a virtual function capability option selection for the virtual interface;
   determining, by the processing device executing the virtualization manager, whether there is an available virtual function associated with the selected logical network;
   responsive to determining there is an available virtual function associated with the selected logical network, assigning the virtual function to the virtual interface;
   responsive to determining there is not an available virtual function associated with the selected logical network and to the virtual function capability option selection indicating that the virtual function capability is not mandatory, determining whether a virtual bridge interface that provides connectivity to the selected logical network is available; and
   responsive to determining that the virtual bridge interface that provides connectivity to the selected logical network is available:
      further configuring, by the processing device, the virtual interface to access the selected logical network by assigning a virtual bridge in place of the virtual function according to the virtual function capability option selection; and
      starting the virtual machine using the virtual bridge interface.

2. The method of claim 1, wherein determining an available virtual function comprises:
   retrieving a list of hypervisors available to the virtualization manager;
   selecting a hypervisor from the list of hypervisors;
   identifying a physical interface supporting virtual function capability that is available to the selected hypervisor;
   retrieving a list of logical networks associated with the physical interface; and
   responsive to identifying the selected logical network specified in the request in the list of logical networks associated with the physical interface, determining an availability status of at least one virtual function associated with the physical interface.

3. The method of claim 2, wherein responsive to the virtual function capability option selection indicating that the virtual function capability is mandatory, configuring the virtual interface in view of the virtual function capability option selection comprises:
   rejecting the request to configure the virtual interface.

4. The method of claim 2, wherein responsive to the virtual function capability option selection indicating that the virtual function capability is not mandatory, configuring the virtual interface to access the selected logical network by assigning the virtual bridge in place of the virtual function comprises:
   retrieving the list of hypervisors available to the virtualization manager;
   responsive to identifying the hypervisor from the list of hypervisors that comprises a physical interface without virtual function capability that is associated with the selected logical network specified in the request, connecting the virtual interface to the physical interface by assigning the virtual bridge in place of the virtual function; and
   responsive to determining that no hypervisor from the list of hypervisors comprises the physical interface without virtual function capability that is associated with the selected logical network specified in the request, rejecting the request to configure the virtual interface.

5. The method of claim 4, further comprising:
   starting the virtual machine;
   monitoring the availability status of the at least one virtual function of the physical interface supporting virtual function capability that is associated with the selected logical network specified in the request;
   responsive to determining the availability status of the at least one virtual function indicates that the at least one virtual function has become available, assigning the virtual function to the virtual interface.

6. The method of claim 5, wherein assigning the virtual function to the virtual interface comprises migrating the virtual machine to a hypervisor with virtual function capability.

7. The method of claim 5, wherein assigning the virtual function to the virtual interface comprises sending a notification to a user that the availability status of the at least one virtual function indicates that the at least one virtual function has become available.

8. A computing apparatus comprising:
   a memory; and
   a processing device, operatively coupled to the memory, to execute a virtualization manager to:
      receive a request to configure a virtual interface of a virtual machine, the request comprising a selected logical network to be associated with the virtual interface and a virtual function capability option selection for the virtual interface;
      responsive to determining there is an available virtual function associated with the selected logical network, assign the virtual function to the virtual interface;
      responsive to determining there is not an available virtual function associated with the selected logical network and to the virtual function capability option selection indicating that the virtual function capability is not mandatory, determine whether a virtual bridge interface that provides connectivity to the selected logical network is available; and
      responsive to determining that the virtual bridge interface that provides connectivity to the selected logical network is available:
         further configure the virtual interface to access the selected logical network by assignment of a virtual bridge in place of the virtual function according to the virtual function capability option selection; and
         start the virtual machine using the virtual bridge interface.

9. The apparatus of claim 8, wherein the processing device is further to:
   determine whether there is an available virtual function associated with the selected logical network.

10. The apparatus of claim 9, wherein to determine an available virtual function, the processing device is to:

retrieve a list of hypervisors available to the virtualization manager;

select a hypervisor from the list of hypervisors;

identify a physical interface supporting virtual function capability that is available to the selected hypervisor;

retrieve a list of logical networks associated with the physical interface; and responsive to identifying the selected logical network specified in the request in the list of logical networks associated with the physical interface, determine an availability status of at least one virtual function associated with the physical interface.

11. The apparatus of claim 10, wherein responsive to the virtual function capability option selection indicating that the virtual function capability is mandatory, configure the virtual interface in view of the virtual function capability option selection, the processing device is to:

rejecting the request to configure the virtual interface.

12. The apparatus of claim 10, wherein responsive to the virtual function capability option selection indicating that the virtual function capability is not mandatory, configure the virtual interface to access the selected logical network by assignment of the virtual bridge in place of the virtual function, the processing device is to:

retrieve the list of hypervisors available to the virtualization manager;

responsive to identifying the hypervisor from the list of hypervisors that comprises a physical interface without virtual function capability that is associated with the selected logical network specified in the request, connect the virtual interface to the physical interface la assignment of the virtual bridge in place of the virtual function; and responsive to determining that no hypervisor from the list of hypervisors comprises the physical interface without virtual function capability that is associated with the selected logical network specified in the request, reject the request to configure the virtual interface.

13. The apparatus of claim 12, wherein the processing device is further to:

start the virtual machine;

monitor the availability status of the at least one virtual function of the physical interface supporting virtual function capability that is associated with the selected logical network specified in the request; and responsive to determining the availability status of the at least one virtual function indicates that the at least one virtual function has become available, assign the virtual function to the virtual interface.

14. The apparatus of claim 13, wherein to assign the virtual function to the virtual interface, the processing device is to at least one of migrate the virtual machine to a hypervisor with virtual function capability, or send a notification to a user that the availability status of the at least one virtual function indicates that the at least one virtual function has become available.

15. A non-transitory computer readable storage medium, having instructions stored therein, which when executed by a processing device of a computer system, cause the processing device to:

receive, by the processing device executing a virtualization manager, a request to configure a virtual interface of a virtual machine, the request comprising a selected logical network to be associated with the virtual interface and a virtual function capability option selection for the virtual interface;

determine, by the processing device executing virtualization manager, whether there is an available virtual function associated with the selected logical network;

responsive to determining there is an available virtual function associated with the selected logical network, assign the virtual function to the virtual interface;

responsive to determining there is not an available virtual function associated with the selected logical network and to the virtual function capability option selection indicating that the virtual function capability is not mandatory, determine whether a virtual bridge interface that provides connectivity to the selected logical network is available; and responsive to determining that the virtual bridge interface that provides connectivity to the selected logical network is available:

further configure, by the processing device executing the virtualization manager, the virtual interface to access the selected logical network by assignment of a virtual bridge in place of the virtual function according to the virtual function capability option selection; and start the virtual machine using the virtual bridge interface.

16. The non-transitory computer readable storage medium of claim 15, wherein to determine an available virtual function, the processing device is to:

retrieve a list of hypervisors available to the virtualization manager;

select a hypervisor from the list of hypervisors;

identify a physical interface supporting virtual function capability that is available to the selected hypervisor;

retrieve a list of logical networks associated with the physical interface; and responsive to identifying the selected logical network specified in the request in the list of logical networks associated with the physical interface, determine an availability status of at least one virtual function associated with the physical interface.

17. The non-transitory computer readable storage medium of claim 16, wherein responsive to the virtual function capability option selection indicating that the virtual function capability is mandatory, configure the virtual interface in view of the virtual function capability option selection, the processing device is to:

reject the request to configure the virtual interface.

18. The non-transitory computer readable storage medium of claim 16, wherein responsive to the virtual function capability option selection indicating that the virtual function capability is not mandatory, configure the virtual interface to access the selected logical network by assignment of the virtual bridge in place of the virtual function, the processing device is to:

retrieve the list of hypervisors available to the virtualization manager;

responsive to identifying the hypervisor from the list of hypervisors that comprises a physical interface without virtual function capability that is associated with the selected logical network specified in the request, connect the virtual interface to the physical interface la assignment of the virtual bridge in place of the virtual function; and responsive to determining that no hypervisor from the list of hypervisors comprises the physical interface without virtual function capability that is associated with the selected logical network specified in the request, reject the request to configure the virtual interface.

19. The non-transitory computer readable storage medium of claim 18, wherein the processing device is further to:
   start the virtual machine;
   monitor the availability status of the at least one virtual function of the physical interface supporting virtual function capability that is associated with the selected logical network specified in the request;
   responsive to determining the availability status of the at least one virtual function indicates that the at least one virtual function has become available, assign the virtual function to the virtual interface.

20. The non-transitory computer readable storage medium of claim 19, wherein to assign the virtual function to the virtual interface, the processing device is to at least one of migrate the virtual machine to a hypervisor with virtual function capability, or send a notification to a user that the availability status of the at least one virtual function indicates that the at least one virtual function has become available.

* * * * *